March 7, 1967   E. M. McGOVERN   3,307,867
SPRING BIASED BUMPER
Filed Sept. 24, 1965

INVENTOR.
EDWARD MICHAEL McGOVERN
BY
Victor J. Evans & Co.
ATTORNEYS 3,307,867
SPRING BIASED BUMPER
Edward Michael McGovern, 435 Jefferson Ave.,
Avon, N.J. 07717
Filed Sept. 24, 1965, Ser. No. 490,002
1 Claim. (Cl. 293—62)

The present invention relates to an improved auto bumper having a spring deflecting construction interposed between bumper plates and each of the four horizontal sides of an automobile, and more particularly relates to a spring construction in which the bumper plate may not only be moved rectilinearly of the vehicle to which the bumper plate is attached, but may be also deflected at different angles to the vertical direction of the oncoming forces, with respect to the plane of the bumper plate, in view of the unique spring construction provided and defined and interposed between the bumper plate and the vehicle.

An object, therefore, of the present invention is to provide a new and improved construction for providing obtuse deflection of improved construction so that the vehicle is more securely protected from accidents and their resulting damage.

A further object of the present invention is to provide bumper protection of a vehicle which is adapted to resist forces applied to the bumper other than those which are generally applied from a vertical direction with respect to the plane of the bumper plate.

Figure 1:
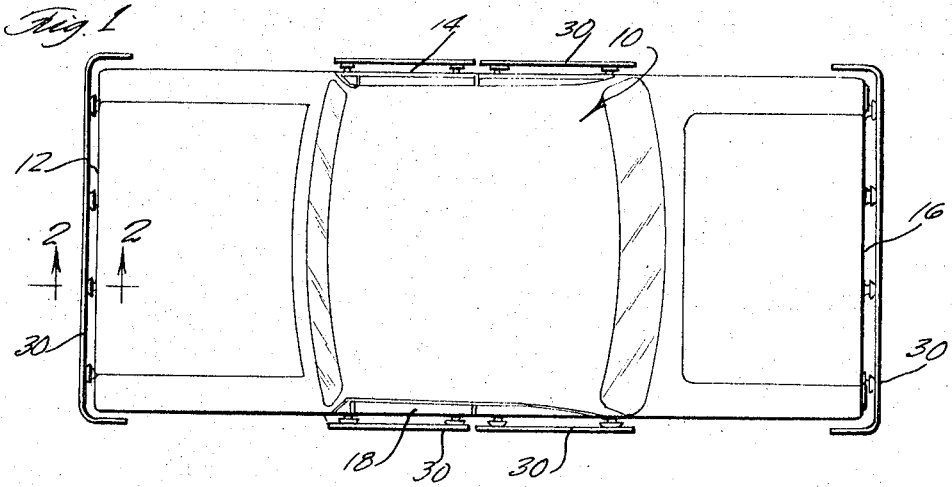
Figure 2:
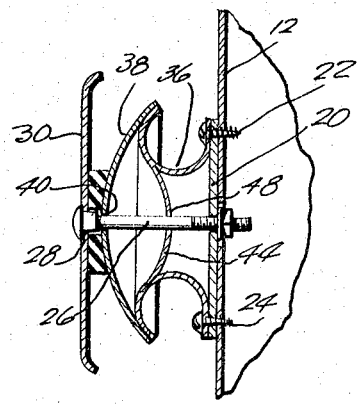
Figure 3:
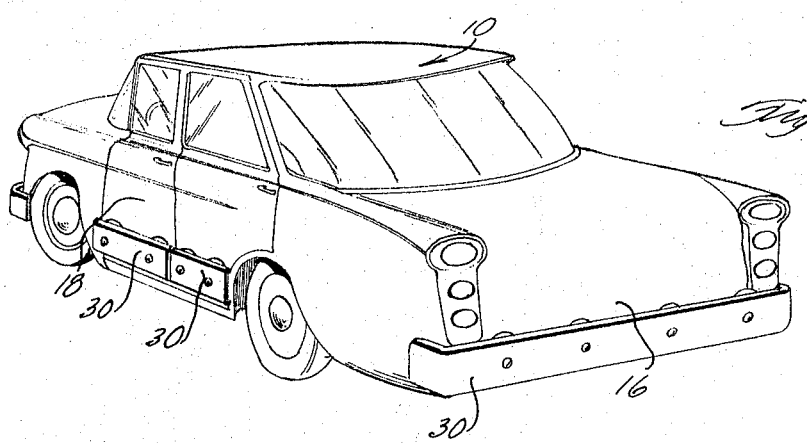

The above and other objects and advantages of the invention will become apparent upon full consideration of the following detailed description and accompanying drawings, in which:

FIGURE 1 is a plan view of an automobile on which is mounted the auto bumper construction of the present invention;

FIGURE 2 is a cross-sectional view of one of the plurality of bumper shock absorbing means interposed between the bumper plate and the side of the automobile, taken along the line 2—2 of FIGURE 1; and FIGURE 3 shows a perspective view of the automobile showing the manner in which the plurality of bumper plates are to be mounted about the four horizontal sides of an automobile in accordance with the present invention.

Referring now to the drawings, there is shown an automobile 10 having four horizontal sides 12, 14, 16, 18. On each of the sides there is mounted a base plate 20 secured by screws 22, 24, all as is shown in FIGURE 2, and there is provided a connecting bolt 26 which extends through a central aperture or hole 28 in a bumper plate 30 so that the bolt interconnects the bumper plate with the base 20 and the side 12.

All of the bumper plates are similarly shown as bumper plates 30, 30. There is interposed between the bumper plates and the automobile sides 12, 14, 16, 18, respectively, a shock absorbing means comprising a series of mounting and spring deflecting members comprising a partially toroidally contoured spring member 36 which is axially disposed upon the bolt 26 and is mounted at one end from the base 20. The other or distal end of the toroidally contoured spring member 36 engages a segmented spherical portion 38 and the central or polar point of said segmented spherical portion 38 is provided with a polar opening 40. The bolt, of course, extends through this polar opening 40, and in order to maintain a degree of alignment, a further aligning and spring member as well as strengthening element is provided in the form of a smaller segmented spherical portion 44 which is opposed in concavity to the concavity of the segmented spherical portion 38. The smaller segmented spherical portion 44 also has a polar opening 48, and this seeks to provide a certain rigidity and resiliency to the effectiveness of the spring in absorbing and accepting tangential or obtusely applied forces to the bumper construction that is mounted on each of the four sides of the automobile 10.

Additional embodiments of the invention in this specification will occur to others and therefore it is intended that the scope of the invention be limited only by the appended claim and not by the embodiment described hereinabove. Accordingly, reference should be made to the following claim in determining the full scope of the invention.

What is claimed is:

An auto bumper comprising a plurality of bumper plates to be mounted about the four horizontal sides of an automobile, a series of bolts having one end extending through central holes in the bumper plates and mounted by the other end of the bolts from said automobile sides, shock absorbing means interposed between the bumper plates and the automobile sides and including a series of arcuately contoured spring deflecting members, an elastomeric pad further interposed between said series of arcuately contoured spring deflection members and the bumper plate, a partially toroidially contoured spring member being axially disposed on said bolt, and a pair of opposing segmented spherical portions are arranged and comprise said series of arcuately contoured spring deflecting members of said shock absorbing means, said shock absorbing means including a base having disposed and mounted thereon a partially toroidially contoured spring member axially disposed upon said bolt, said pair of opposing segmented spherical portions each having a polar opening through which passes one of said bolts.

References Cited by the Examiner

UNITED STATES PATENTS

| 1,754,112 | 4/1930 | Lusse | 293—62 |
| 2,312,052 | 2/1943 | Premo | 293—62 |
| 2,329,808 | 9/1943 | Wolfe | 293—62 |
| 2,432,717 | 12/1947 | Berger | 267—1 |

FOREIGN PATENTS

| 446,174 | 5/1926 | Germany. |
| 596,535 | 4/1925 | France. |

ARTHUR L. LA POINT, *Primary Examiner.*

H. BELTRAN, *Assistant Examiner.*